(12) United States Patent
Ou et al.

(10) Patent No.: US 7,912,691 B2
(45) Date of Patent: Mar. 22, 2011

(54) METHODS OF PLACING RECONFIGURABLE OPTICAL ADD/DROP MULTIPLEXERS (ROADMS) IN A NETWORK

(75) Inventors: Canhui Ou, Danville, CA (US); Steven Gemelos, Cupertino, CA (US); Jian Li, Sunnyvale, CA (US); Howard S. Mountford, Danville, CA (US); Orlando Echeverria-Calvet, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 882 days.

(21) Appl. No.: 11/803,010

(22) Filed: May 11, 2007

(65) Prior Publication Data

US 2008/0279552 A1 Nov. 13, 2008

(51) Int. Cl.
*G06F 17/50* (2006.01)
(52) U.S. Cl. ......................................................... 703/13
(58) Field of Classification Search ..................... 703/13
See application file for complete search history.

(56) References Cited

U.S. PATENT DOCUMENTS

| | | | |
|---|---|---|---|
| 5,970,239 A * | 10/1999 | Bahl et al. | 704/245 |
| 6,842,723 B2 * | 1/2005 | Alicherry et al. | 703/2 |
| 7,080,031 B2 | 7/2006 | Crowe et al. | |
| 7,096,173 B1 | 8/2006 | Rappaport et al. | |
| 2002/0118687 A1 * | 8/2002 | Chow et al. | 370/404 |
| 2004/0143428 A1 * | 7/2004 | Rappaport et al. | 703/22 |
| 2005/0060395 A1 | 3/2005 | Korotky | |
| 2005/0169196 A1 * | 8/2005 | Carpenter et al. | 370/255 |
| 2008/0151777 A1 * | 6/2008 | Allen et al. | 370/254 |

OTHER PUBLICATIONS

Lorne Mason et al., "Topological design and dimensioning of Agile All-Photonic Networks", Jun. 24, 2005, Computer Networks, vol. 50, pp. 268-287.*
Chandra Chekuri et al., "Design tools for transparent optical networks", Aug. 4, 2006 (available online), Bell Labs Technical Journal, vol. 11, issue 2, pp. 129-143.*
Thomas C. Banwell et al., "Powering the fiber loop optically-a cost analysis", 1993, Journal of Lightwave Technology, vol. 11, No. 3, pp. 481-494.*
Gerd Keiser, "Optical communications essentials", 2003, McGraw-Hill, p. 265.*
Neil Geary et al., "Analysis of optimization issues in multi-period DWDM network planning", 2001, INFOCOM 2001, pp. 152-158.*
Neophytos Antoniades et al., "Performance engineering and topological design of metro WDM optical networks using computer simulation", 2002, IEEE Journal on Selected Areas in Communications, vol. 20, No. 1, pp. 149-165.*
Alain Sutter et al., "Optimal placement of add/drop multiplexers: heuristic and exact algorithms", 1998, Operations research, vol. 46, pp. 719-728.*
Teresa C. Mann Piliouras, "Network design: management and technical perspectives", 2005, second edition, CRC Press, pp. 499-500.*

* cited by examiner

*Primary Examiner* — Jason Proctor
*Assistant Examiner* — Russ Guill
(74) *Attorney, Agent, or Firm* — Toler Law Group

(57) ABSTRACT

A distributed network including at least two Reconfigurable Optical Add/Drop Multiplexers (ROADMs) may be designed by a method including simulating routing of data traffic in a distributed network. The method may also include identifying a first location for placement of a first ROADM based at least partially on the simulated routing of the data traffic. The method may also include simulating rerouting of data traffic in the distributed network including the first ROADM at the first location. The method may further include identifying a second location for placement of a second ROADM based at least partially on the simulated rerouting of the data traffic.

15 Claims, 5 Drawing Sheets

US 7,912,691 B2

METHODS OF PLACING RECONFIGURABLE OPTICAL ADD/DROP MULTIPLEXERS (ROADMS) IN A NETWORK

FIELD OF THE DISCLOSURE

The present disclosure is generally related to placing reconfigurable optical add/drop multiplexers in a network.

BACKGROUND

As data communications increase, the demand placed on data distribution networks increases. To help meet this demand distributed data networks may increasingly use fiber optic communications. However, the cost of installing fiber spans and the cost of increasingly complex optics to communication more data over longer distances may be prohibitive. Reconfigurable optical add/drop multiplexers (ROADMs) can assist with meeting certain network design objects. However, ROADMs may also be prohibitively expensive. Hence, there is a need for an improved method of placing ROADMs in a network.

DETAILED DESCRIPTION OF THE DRAWINGS

Figure 1:
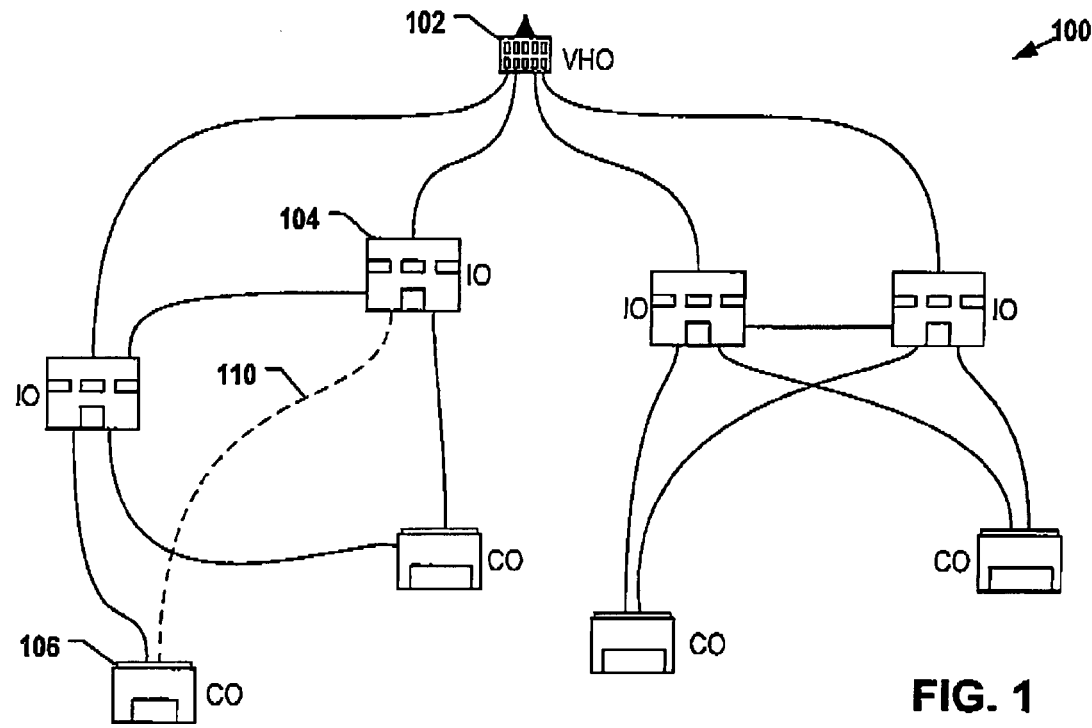
FIG. 1 is a diagram of an embodiment of a first representation of a network.

In a particular embodiment, a distributed network including at least two Reconfigurable Optical Add/Drop Multiplexers (ROADMs) may be associated with a representation of the distributed network. The representation of the distributed network may be generated by a method including identifying a first location for placement of a first ROADM based at least partially on the simulated routing of the data traffic. The method may also include simulating rerouting of data traffic in the distributed network including the first ROADM at the first location. The method may further include identifying a second location for placement of a second ROADM based at least partially on the simulated rerouting of the data traffic.

In a particular embodiment, a method of placing a Reconfigurable Optical Add/Drop Multiplexer (ROADM) in network may include generating a representation of a distributed network. The distributed network may include a plurality of fiber optic spans. The method also includes simulating routing of data traffic via the distributed network using the representation of the distributed network. The method further includes identifying at least one of the plurality of fiber optic spans that exceeds a design threshold. The method also includes generating a second representation of the distributed network. The second representation of the distributed network includes at least one Reconfigurable Optical Add/Drop Multiplexer ROADM coupled to the at least one identified fiber optic span. The method also includes simulating rerouting of data traffic via the distributed network using the second representation of the distributed network.

In a particular embodiment, a method of placing a Reconfigurable Optical Add/Drop Multiplexer (ROADM) in network may include identifying a plurality of candidate locations based at least partially on an initial simulated routing of data traffic in a distributed network. The method may also include selecting at least one of the plurality of candidate locations for placement of the ROADM based at least partially on a cost. The method may also include simulating rerouting of data traffic in the distributed network including the at least one ROADM at the at least one selected candidate location.

In a particular embodiment, a processor-readable medium may include instructions executable by a processor to identify a plurality of candidate locations based at least partially on a simulated routing of data traffic in a distributed data network. The processor-readable medium may also include instructions executable by the processor to select at least one of the candidate locations for placement of a Reconfigurable Optical Add/Drop Multiplexer (ROADM). The processor-readable medium may include instructions executable by the processor to store a record of the at least one selected candidate location for use in simulating rerouting of data traffic in the distributed network with the at least one ROADM included at the at least one selected candidate location.

FIG. 1 is a diagram of a first representation of a network, generally designated 100. The first representation of the network 100 models a video hub office (VHO) 102 coupled, via a plurality of fiber optic spans, to a plurality of intermediate hub offices (IOs), including a first IO 104. In a particular embodiment, the VHO 102 may communicate directly with the first IO 104 via one or more fiber optic spans. In another embodiment, the VHO 102 may communicate indirectly with the first IO 104 via one or more intermediary devices or offices (not shown) between the VHO 102 and the first IO 104. The IOs are coupled, via a plurality of fiber optic spans, to a plurality of central offices (COs), such a first CO 106. Additionally, one or more of the IOs may be coupled together to provide communication path redundancy. The COs may communicate with one or more IOs or one or more other COs directly, or through one or more intermediary devices or offices (not shown).

In a particular embodiment, the first representation of the network 100 may be associated with a distributed network, and may be used to simulate routing of data traffic in the distributed network to identify portions of the distributed network that do not meet design criteria or objectives. For example, the design criteria or objectives may specify cost, performance, capacity, spare capacity, other design criteria or objectives, or any combination thereof. In a particular illustrative embodiment, the design criteria may include a requirement that each fiber span include at least a minimum amount of spare capacity, e.g., a minimum number of spare fibers. In another particular illustrative embodiment, the design criteria may include a restriction on the length of a fiber span, or a restriction on the types of optics used. That is, the design criteria may limit the use of upgraded optics, such as long-range optics or extended-range optics.

The first representation of the network 100 may be used to simulate routing of data traffic to identify a candidate location for placement of a reconfigurable optical add/drop multiplexer (ROADM). For example, locations that do not meet the design criteria may be identified as candidate locations for placement of ROADMs. To illustrate, as depicted, the fiber optic span 110 represents a span that, based on the simulated routing of data traffic, has a length greater than the design criteria, as indicated by the dashed line. The length of the fiber optic span 110 may indicate that upgraded optics, such as long-range optics or extended-range optics, should be used at the first IO 104 and the first CO 106.

Figure 2:
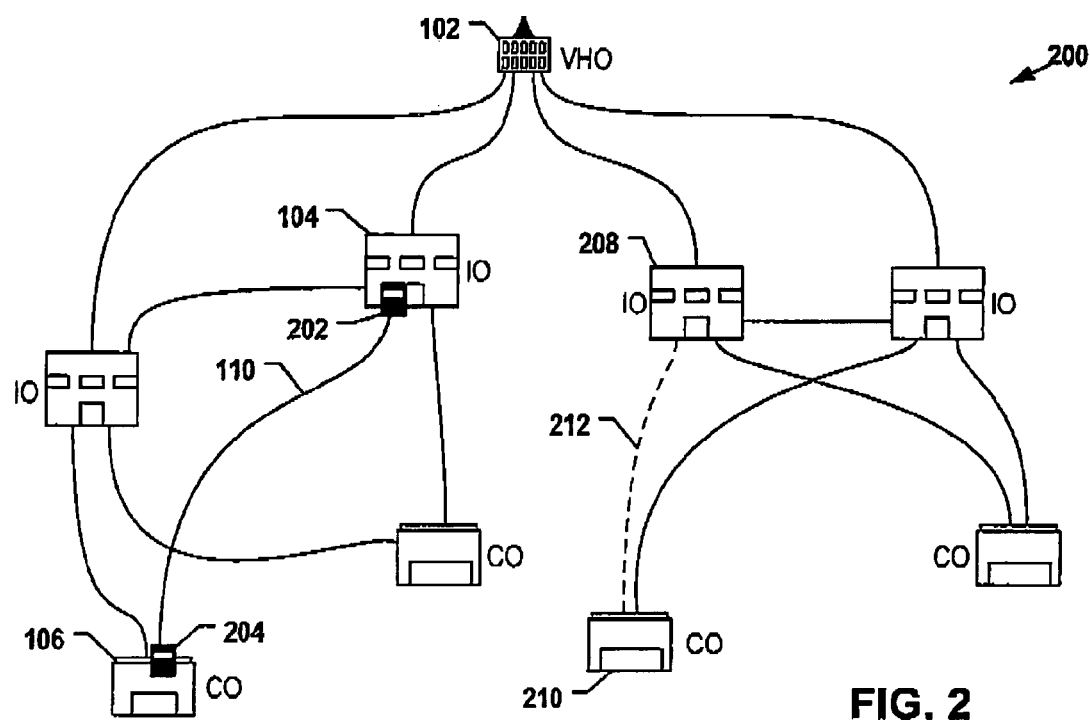
FIG. 2 is a diagram of an embodiment of a second representation of a network.

FIG. 2 is a diagram of an embodiment of a second representation of a network generally designated 200. The second representation of the network 200 is substantially the same as the first representation of the network 100, depicted in FIG. 1, except that a first Reconfigurable Optical Add/Drop Multiplexer (ROADM) 202 has been placed at first IO 104, and a second ROADM 204 has been placed at the first CO 106. Additionally the flow of data traffic within the second representation of the network 200 has been simulated with the first ROADM 202 and the second ROADM 204 included in the second representation of the network 200. With the first ROADM 202 and the second ROADM 204 in place, the simulation of the data traffic indicates that a second fiber span 212 fails to meet the design criteria. For example, the second fiber span 212 may not have a threshold amount of spare capacity. Thus, the simulated data traffic indicates that second IO 208 and second CO 210 may be candidate locations for placement of ROADMs.

Figure 3:
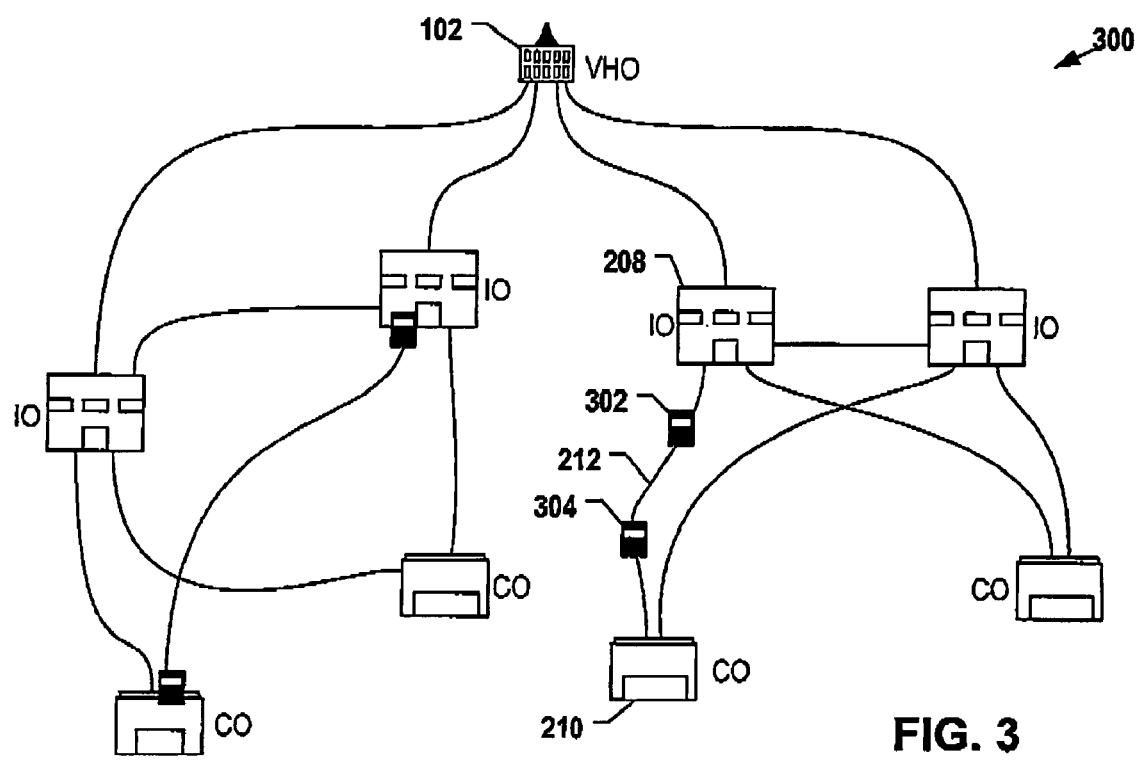
FIG. 3 is a diagram of an embodiment of a third representation of a network.

FIG. 3 is a diagram of an embodiment of a third representation of a network, generally designated 300. The third representation of the network 300 is substantially the same as the second representation of network 200, depicted in FIG. 2, except that a third Reconfigurable Optical Add/Drop Multiplexer (ROADM) 302 and a fourth ROADM 304 have been placed between and the second CO 210 and the second IO 208. Additionally the flow of data traffic within the third representation of the network 300 has been simulated with the third ROADM 302 and the fourth ROADM 304 included in the third representation of the network 300. With the third ROADM 302 and the fourth ROADM 304 in place, the simulation of the data traffic indicates that a no fiber span fails to meet the design criteria.

Figure 4:
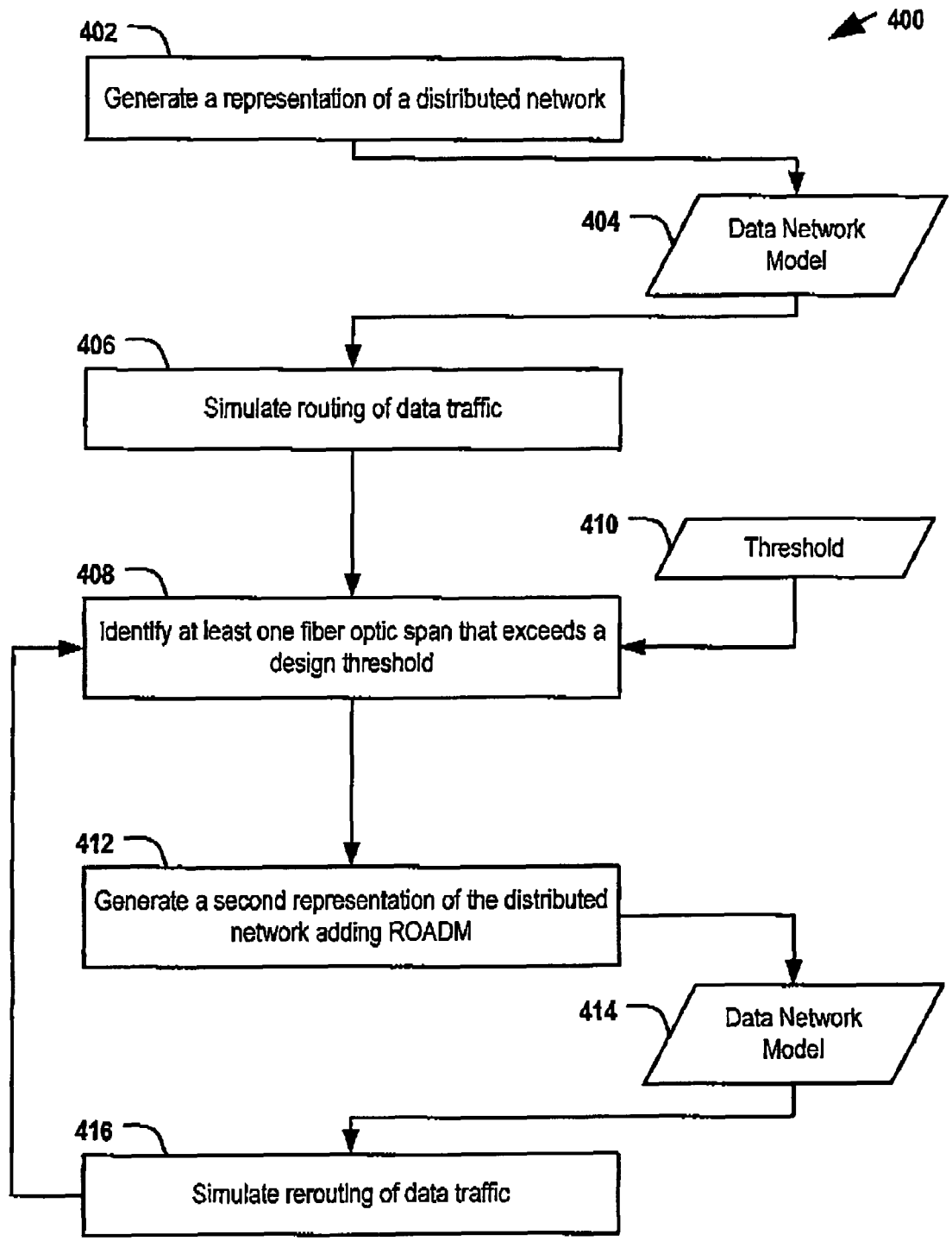
FIG. 4 is a flow diagram of a first embodiment of a method of placing a reconfigurable optical add/drop multiplexer (ROADM) in a network.

FIG. 4 is a flow diagram of a first embodiment of a method (generally designated 400) of placing a reconfigurable optical add/drop multiplexer (ROADM) in a network. The method 400 includes, at 402, generating a representation of a distributed network. The distributed network may include a plurality of fiber optic spans. In an illustrative embodiment, the representation of the distributed network may include a data network model 404. The representation of the distributed network may include information about the plurality of fiber optic spans and nodes of the distributed network, such as optical equipment coupled to the fiber optic spans, electronic equipment coupled to the fiber optic spans, locations of the nodes, other information representative of the distributed network, or any combination thereof. The data network model 404 may be capable of modeling the routing of data traffic in the distributed network. In a particular embodiment, the data network model 404 may model an existing distributed network, such as an actual physical and logical system of network nodes that is deployed when the model is created. In another particular embodiment, the data network model 404 may model a planned distributed network, such as a system that is not physically assembled or in operation at the time the model is created. In another particular embodiment the data network model 404 may include one or more elements of an existing distributed network as well as one or more planned or projected elements of the distributed network.

In a particular embodiment, the method 400 may include, at 406, simulating routing of data traffic using the representation of the distributed network. For example, the data traffic may be simulated using an existing or planned configuration of the distributed network. The simulated routing may be based on existing data traffic, projected data traffic or both. The simulated routing of the data traffic may be adapted to route the data traffic to achieve desired goals, such as to maintain quality of service for customers, to optimize or otherwise tune the network performance, to minimize costs, to achieve other specified goals, or any combination thereof.

In a particular embodiment the method 400 may also include, at 408, identifying at least one of the plurality of fiber optic spans that exceeds a design hold 410. For example, a particular fiber optic span may have fewer than a threshold number of spare fibers available based on the simulated routing of data traffic. In another example, a particular fiber optic span may have a length greater than a threshold length based not the simulated routing of the data traffic. In a particular illustrative embodiment, the threshold length of a fiber optic span may be established such that upgraded optics are not required to service the span. For example, as length of the span increases signal attenuation along the span may increase, and the optical systems used to send data via the span may be upgraded to deal with the increased signal attenuation. Such optical systems may be referred to as "long-range" optics or "extended-range" optics. In an illustrative embodiment, standard optics may be used to convey data where the fiber span has a decibel (dB) margin of less than about 11 dB. Long rang optics may be used to convey data where the fiber span has a dB margin of between about 11 dB and about 14 dB. Extended range optics may be used to convey data where the fiber span has a dB margin of greater than about 14 dB.

In a particular embodiment the method 400 may also include, at 412, generating a second representation of the distributed network. For example, the second representation of the distributed network may include a second data network model 414. The second data network model 414 may include at least one Reconfigurable Optical Add/Drop Multiplexer (ROADM) coupled to the at least one identified fiber optic span. For example, if the fiber optic span that exceeded the design threshold included upgraded optics, one or more of the upgraded optical devices may be replaced with a ROADM in the second data network model. In another example, if the fiber optic span that exceeded the design threshold had too few spare fibers, ROADMs may be coupled to each end of that span.

In a particular embodiment, the method 400 may also include, at 416, simulating rerouting of data traffic via the distributed network using the second representation of the distributed network. The simulated rerouting of the data traffic may account for the presence of the one or ROADMs added to the distributed network in the second representation of the distributed network. Based on the simulated rerouting of data traffic, one or more additional fiber spans that exceed a design threshold may be identified. Additionally, a third or subsequent representation of the distributed network may be generated that includes one or more additional ROADMs. The third or subsequent representation of the distributed network may be used to simulate rerouting of data traffic in the distributed network. This process may continue iteratively until all of the fiber spans meet the design threshold, or until another desired state of the distributed network or the distributed network design process is reached, e.g., until a targeted expected cost savings is achieved.

Figure 5:
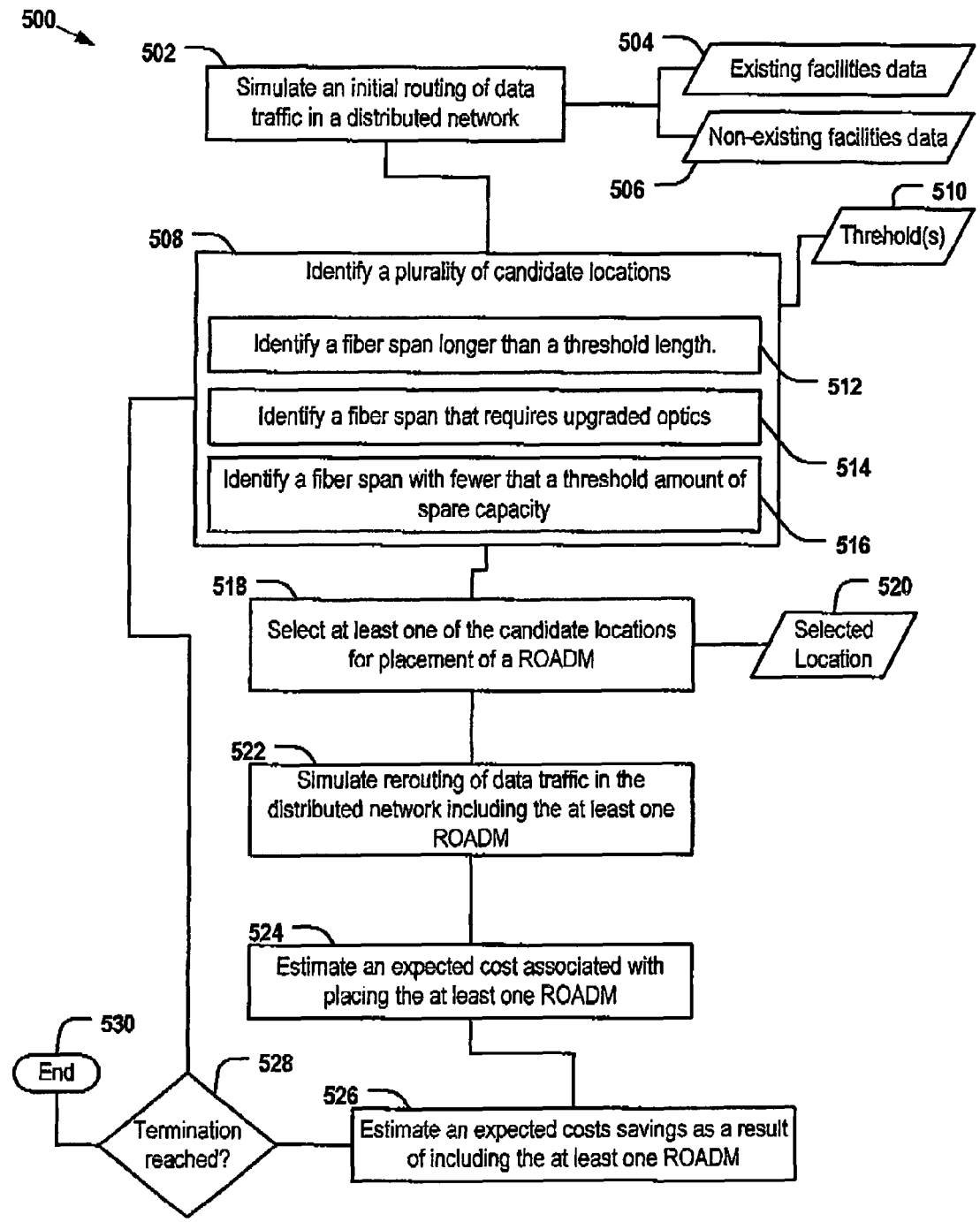
FIG. 5 is a flow diagram of a second embodiment of a method of placing a ROADM in a network.

FIG. 5 is a flow diagram of a second embodiment of a method (generally designated 500) of placing a reconfigurable optical add/drop multiplexer (ROADM) in a network. The method 500 includes, at 502, simulating an initial routing of data traffic in a distributed network. The initial routing of data traffic may be simulated based on data 504 related to one or more pre-existing facilities, or based on data 506 related to one or more facilities that are not pre-existing, such as a so called "green field" installations. In a particular embodiment, the initial routing of data traffic may be based on both the data 504 related to pre-existing facilities and the data 506 related to non-existing facilities, such as one or more new, planned or proposed facilities.

In a particular embodiment the method 500 may include, at 508, identifying a plurality of candidate locations based at least partially on the initial simulated routing of data traffic in the distributed network. For example, one or more of the candidate locations may be identified based on comparing network nodes or fiber spans of the distributed network to a design threshold 510. The network nodes may include equipment located at central office facilities. In an illustrative embodiment, the threshold 510 may include a minimum amount of spare capacity for each fiber span. In this embodiment, identifying a plurality of candidate location may include, at 516, identifying a fiber span with less than the threshold 510 amount of spare capacity. For example, one of the candidate locations may include a central office facility or other data communication facility associated with a fiber span that does not include a required number of spare fibers. In another illustrative embodiment, the threshold 510 may include a maximum fiber span length. In this embodiment, identifying a plurality of candidate location may include, at 512, identifying a fiber span longer than the threshold length. In another illustrative embodiment, the threshold 510 may include a cost threshold related to the type of optics that can be used at the candidate location. In this embodiment, identifying a plurality of candidate location may include, at 514, identifying a fiber span that requires upgraded optics. For example, long fiber spans may utilize upgraded optics to overcome signal attenuation over their length. Thus, the threshold 510 may be related to circumstances within the network that may require upgraded optics. For example, the threshold 510 may specify a decibel (dB) margin limit, and identifying the plurality of candidate locations, at 508, may include identifying locations that exceed the dB margin limit, and thus may require upgraded or non-standard optics. For example, the threshold 510 may be set at about 11 db. In a particular embodiment, a dB margin greater that 11 dB may indicate that long-range optics should be used. In another example, the threshold 510 may be set at about 14 dB. In a particular embodiment, a dB margin greater than about 14 dB may indicate that extended range optics should be used.

In a particular embodiment, the method 500 may include, at 518, selecting at least one of the plurality of candidate locations 520 for placement of a Reconfigurable Optical Add/Drop Multiplexer (ROADM). In an illustrative embodiment, the at least one selected candidate location 520 may be selected based on an expected cost or expected cost savings. For example, the cost of upgraded optics may be greater than the cost of a ROADM thus a cost savings may be achieved by installing the ROADM rather than the upgraded optics. Similarly, the cost of installing additional fibers in a span may be greater than the cost of installing a ROADM, thus a cost savings may be achieved by installing the ROADM rather than installing additional fibers.

In a particular embodiment, the method 500 may include, at 522, simulating rerouting of data traffic in the distributed network including the at least one ROADM at the at least one selected candidate location. The simulated rerouting of data traffic may take into account the additional functionality available in the ROADM, such as the ability to dynamically add or drop wavelengths used in the fiber span. Thus, the presence of the ROADM in the distributed network may cause the simulation to route data traffic differently to achieve the design criteria or objectives.

In a particular embodiment, the method 500 may also include, at 524, estimating an expected cost associated with placing the at least one ROADM. For example, the method 500 may include estimating an expected operating cost savings or an expected capital cost saying from placing the ROADM at the at least one candidate location.

In a particular embodiment, the method 500 may include, at 528, determining whether a termination has been reached. If a termination has been reached, the method may end, at 530. If no termination has been reached, the method 500 may iteratively continue to identify candidate locations, select locations for placement of ROADM and simulate rerouting of the data traffic until a termination is reached. The termination may include an event selected to trigger an end to the iterative process. For example, the termination may be reached when placement of at least one additional ROADM does not result in estimated cost savings. In another example, the termination may be reached when no additional candidate locations are identified. In another example, the termination may be reached when a desired estimated cost savings is achieved.

Figure 6:
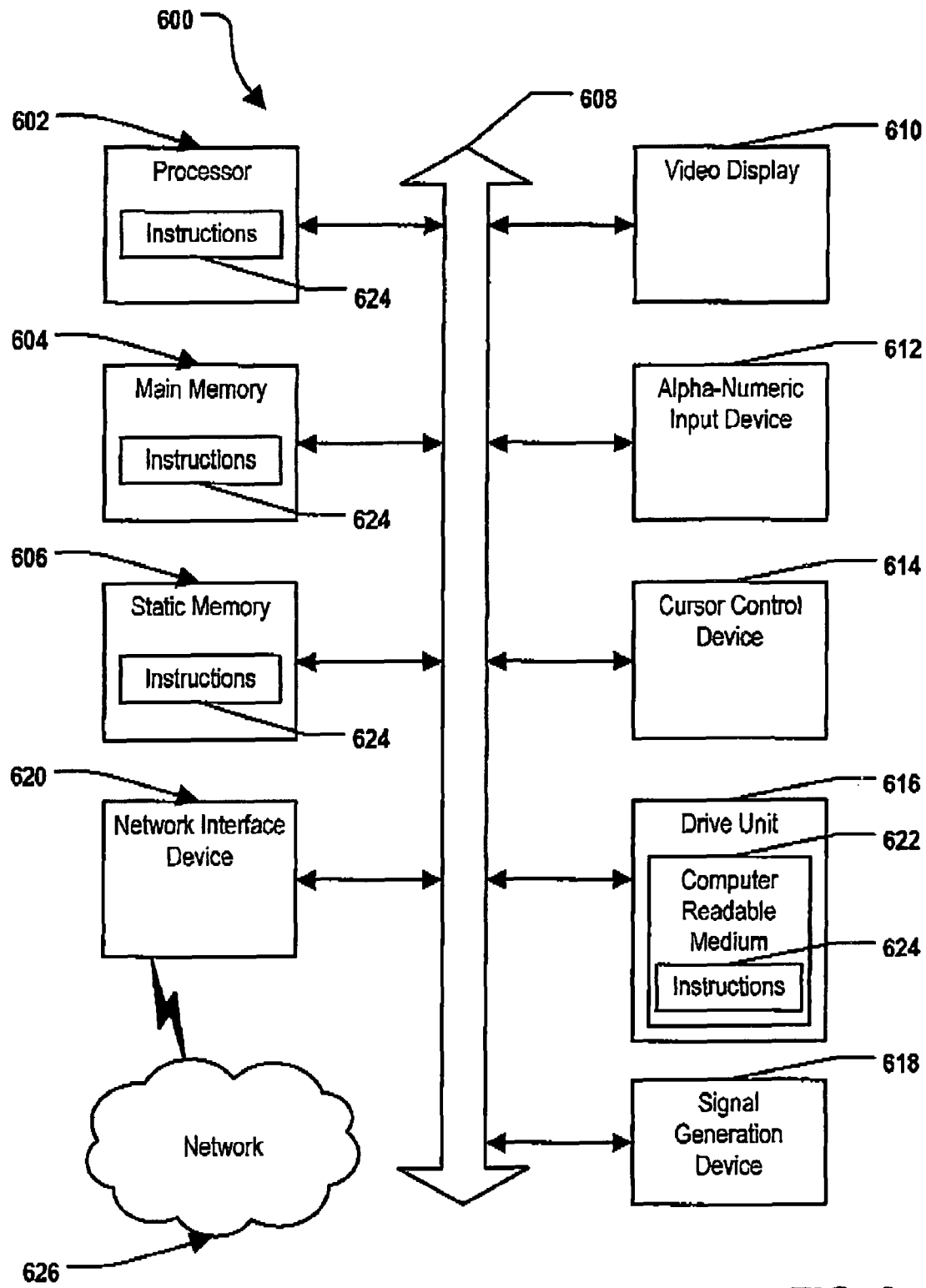
FIG. 6 is a block diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices. For example, the computer system 600 may Include, or be included within any one or more of the video hub offices, intermediate offices, central offices or reconfigurable optical add/drop multiplexers discussed with reference to FIGS. 1-5.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606, that can communicate with each other via a bus 608. As shown, the computer system 600 may firer include a video display unit 610, such as a liquid crystal display LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also way include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP. HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
identifying a plurality of candidate locations of a distributed network that do not satisfy design criteria based on an initial simulated routing of data traffic in the distributed network, the design criteria including a threshold amount of spare capacity and long-range optics, wherein a first candidate location of the plurality of candidate locations comprises a first fiber span with less than the threshold amount of spare capacity, and wherein a second candidate location of the plurality of candidate locations comprises a fiber span that does not include the long-range optics;
selecting at least one of the plurality of candidate locations for placement of a Reconfigurable Optical Add/Drop Multiplexer (ROADM) based at least partially on a cost;
simulating rerouting of data traffic in the distributed network including the ROADM at the at least one selected candidate location;
iteratively, until a termination is reached:
identifying additional candidate locations based on the design criteria;
selecting one of the additional candidate locations for placement of an additional ROADM;
simulating rerouting of data traffic on the distributed network based on placement of the additional ROADM at the selected one additional candidate location; and
reaching the termination when no additional candidate locations are identified; and
generating a representation of the distributed network that includes the additional ROADM placed at the selected one additional candidate location.

2. The method of claim 1, further comprising estimating an expected costs savings as a result of including the ROADM at the at least one selected candidate location.

3. The method of claim 1, wherein the initial routing of data traffic is simulated based on one or more pre-existing facilities.

4. The method of claim 1, wherein the initial routing of data traffic is simulated based on one or more facilities that are not pre-existing.

5. The method of claim 1, wherein identifying a plurality of candidate locations based on the simulated initial routing comprises identifying a fiber span longer than a threshold length.

6. The method of claim 1, wherein at least one of the plurality of candidate locations includes a central office facility.

7. The method of claim 1, wherein at least one of the candidate locations is coupled to a fiber span with a decibel (dB) margin greater than 11 dB.

8. The method of claim 1, wherein at least one of the candidate locations is coupled to a fiber span with a decibel (dB) margin greater than 14 dB.

9. A non-transitory processor-readable storage medium comprising instructions executable by a processor to:

identify a plurality of candidate locations of a distributed data network that do not satisfy design criteria based on a simulated routing of data traffic in the distributed data network, the design criteria including a threshold amount of spare capacity and long-range optics, wherein a first candidate location of the plurality of candidate locations comprises a first fiber span with less than the threshold amount of spare capacity, and wherein a second candidate location of the plurality of candidate locations comprises a fiber span that does not include the long-range optics;
select at least one of the candidate locations for placement of a Reconfigurable Optical Add/Drop Multiplexer (ROADM);
store a record of the at least one selected candidate location for use in simulating rerouting of data traffic in the distributed network with the ROADM included at the at least one selected candidate location;
iteratively, until a termination is reached:
identify additional candidate locations based on the design criteria;
select one of the additional candidate locations for placement of an additional ROADM;
simulate rerouting of data traffic on the distributed data network based on placement of the additional ROADM at the selected one additional candidate location; and
reaching the termination when no additional candidate locations are identified; and
generate a representation of the distributed data network that includes the additional ROADM placed at the selected one additional candidate location.

10. The non-transitory processor-readable storage medium of claim 9, further comprising instructions executable by the processor to estimate an expected cost associated with placing the ROADM at the at least one selected candidate location.

11. The non-transitory processor-readable storage medium of claim 9, further comprising instructions executable by the processor to simulate routing of data traffic in the distributed data network before identifying the plurality of candidate locations.

12. The non-transitory processor-readable storage of claim 9, wherein a fiber span coupled to at least one of the candidate locations exceeds a threshold length based on the simulated routing of data traffic in the distributed data network.

13. The non-transitory processor-readable storage medium of claim 9, wherein the at least one selected candidate location includes at least one long-range (LR) optics component in the simulated routing of the data traffic, and wherein the at least one LR optics component is replaced by the at least one ROADM in the simulated rerouting of the data traffic.

14. The non-transitory processor-readable storage medium of claim 9, wherein the termination is reached when placement of at least one additional ROADM does not result in estimated cost savings.

15. The non-transitory processor-readable storage medium of claim 9, wherein the termination is reached when a particular estimated cost savings is achieved.

* * * * *